No. 622,950. Patented Apr. 11, 1899.
C. HEBARD.
PORTABLE BALING DEVICE.
(Application filed Nov. 18, 1898.)
(No Model.) 2 Sheets—Sheet 1.

WITNESSES: INVENTOR
C. Hebard
BY
ATTORNEYS.

No. 622,950. Patented Apr. 11, 1899.
C. HEBARD.
PORTABLE BALING DEVICE.
(Application filed Nov. 18, 1898.)

(No Model.) 2 Sheets—Sheet 2.

WITNESSES:
John a Bergstrom
H. L. Reynolds.

INVENTOR
C. Hebard
BY
[signature]
ATTORNEYS.

UNITED STATES PATENT OFFICE.

CHARLES HEBARD, OF PEQUAMING, MICHIGAN.

PORTABLE BALING DEVICE.

SPECIFICATION forming part of Letters Patent No. 622,950, dated April 11, 1899.

Application filed November 18, 1898. Serial No. 696,795. (No model.)

*To all whom it may concern:*

Be it known that I, CHARLES HEBARD, of Pequaming, in the county of Baraga and State of Michigan, have invented a new and improved Portable Baling Device, of which the following is a full, clear, and exact description.

My invention relates to an improvement in portable baling devices designed particularly for use in baling hemlock or other bark in the woods, and comprises the novel features hereinafter described and claimed.

Reference is to be had to the accompanying drawings, forming a part of this specification, in which similar characters of reference indicate corresponding parts in all the figures.

Figure 1:
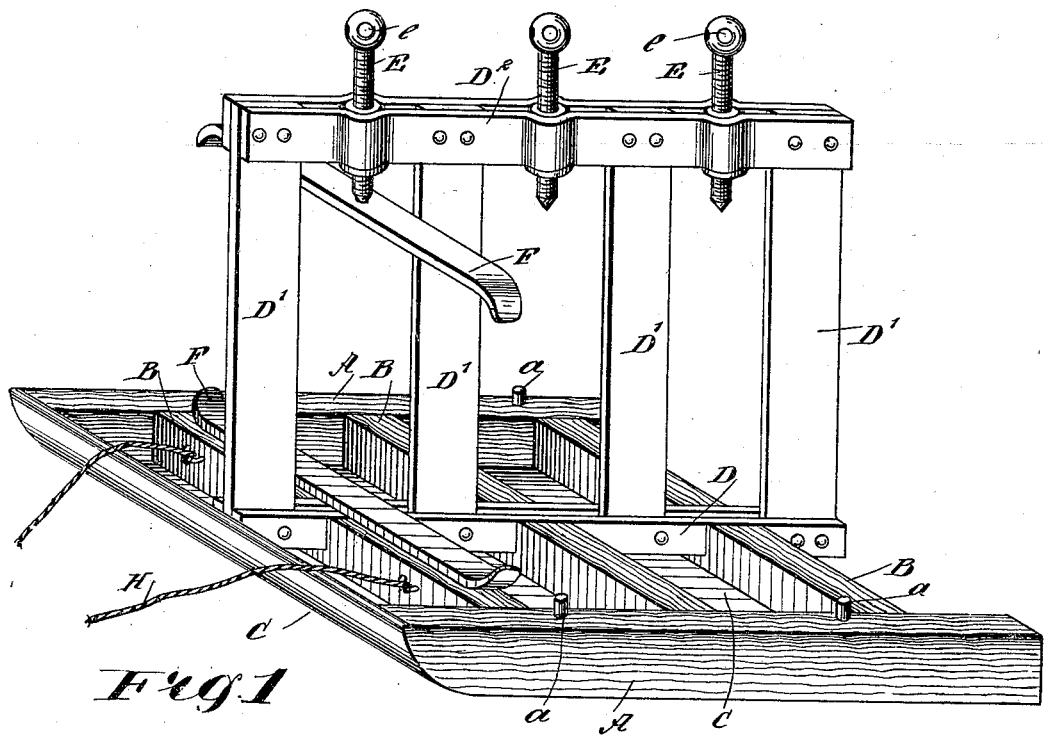
Figure 2:
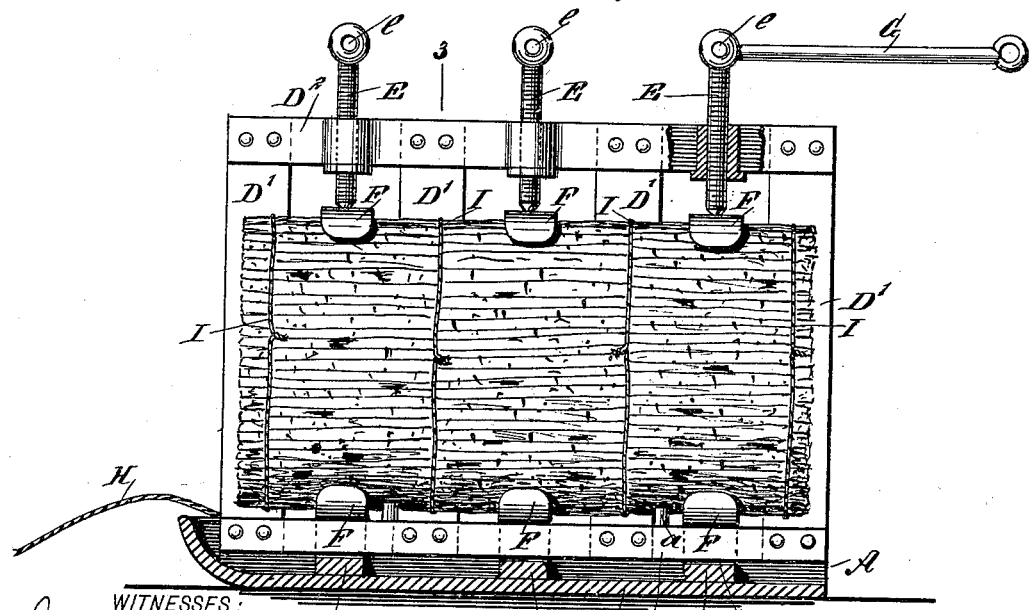
Figure 3:
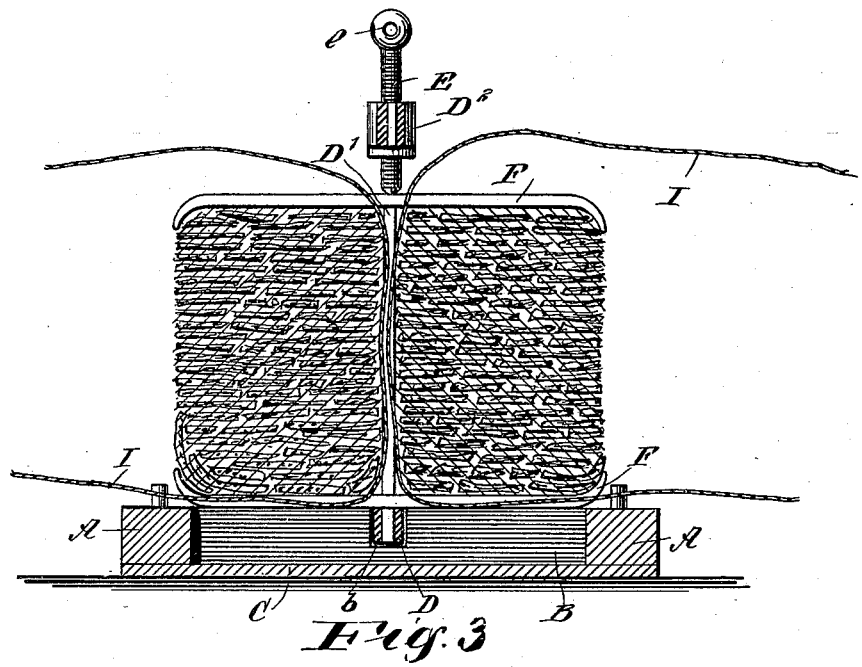
Figure 4:
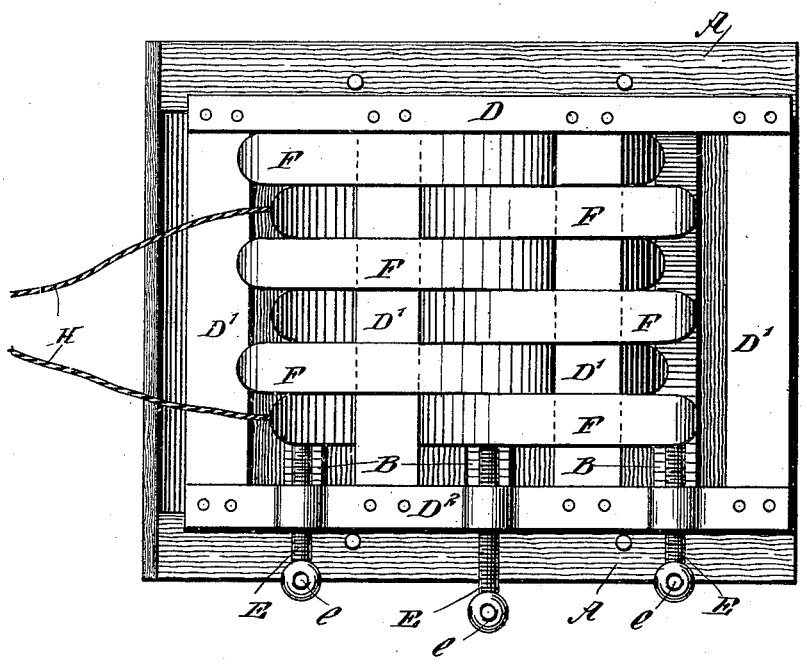

Figure 1 is a perspective view of my device in position for use. Fig. 2 is a side elevation, partially in section, showing a bale in position on the base. Fig. 3 is a cross-section upon the line 3 3 in Fig. 2, and Fig. 4 is a plan view of the device in position for transportation from one point to another.

In procuring bark from the woods it is often inconvenient to take a wagon or sled of ordinary construction to the points where the bark lies, and thus it is inconvenient to get the bark out of the woods and upon the roads.

The object of my invention is to construct a readily-transportable baling device which may be carried to any point in the woods, so that the bark may be baled where it lies, the bales being then removed upon any suitable form of drag or sled, said drag or sled being made narrow and small, so that it may be taken anywhere required.

My baling device is mounted upon a base consisting of a framework constructed in the form of a shallow sled or toboggan and having longitudinal beams A, cross-bars B, connecting said beams, and a bottom or flooring C. To said base is attached a rope H, by means of which the base may be dragged over the ground and even over logs and stumps, and being wide and flat the base is not liable to be overturned.

The cross-bars B are provided midway of their length with notches $b$, adapted to receive the lower end of a frame which carries the means for compressing the bark into bales. In lieu of the notches $b$ sockets or any other suitable means may be employed by which said frame may be held in vertical position.

The frame which carries the compressing or baling device consists of spaced pairs of bars, constituting the parallel longitudinal members D and $D^2$, and standards $D'$, entered at their ends between the pairs of bars and secured thereto by bolts, rivets, or by any other suitable means. The lower member D of said frame is of such width as to fit in the notches $b$ in the cross-bars B of the base, so that said frame will be held in vertical position, and in sockets held between the pair of bars constituting the upper member $D^2$ of the frame are mounted to turn a series of screw-rods E.

Two sets of retaining and compressing arms F are employed, one set beneath the pile of bark and the other set on top of the pile of bark. Previous to piling up the bark wires or cords I or other bale-securing means are placed in position on the base, as shown in Fig. 3. A set of the bars F is then placed on the base and the bark is piled thereon at each side of the center of the frame of the compressing and baling device, as indicated in Figs. 2 and 3. When the bark has been piled nearly to the top of the compressing and baling frame, the upper set of bars F is placed on top of the bark, said bars being provided with a series of small recesses adapted to receive the lower pointed ends of the screw-rods E. The latter are provided with heads at their upper ends, in which are formed apertures $e$, adapted to receive a bar G or other suitable tool, whereby the rods E may be tightly screwed down upon said upper bars F and thus compress the bale of bark. The bale is prevented from displacement by the engagement of the bent ends of the two sets of bars F with the upper and lower side edges of the bale. When the bale of bark has been sufficiently compressed, the cords or wires I are brought together about the bale and their ends are secured together in any suitable manner. The pressure of the rods E on the upper bars F is then released and said bars and the completed bale are removed.

It is evident that other means for applying compression to the bars F, substantially the equivalent of the screw-rods E, may be employed—as, for instance, a rack and pinion, rams of any sort, cams, or other similar devices.

The bark after having been baled as described may readily be removed from the woods to the roads upon small sleds drawn by hand or by a horse, and the sleds being small will be able to reach places to which it would be extremely difficult if not impossible to take a sled of ordinary size.

When it is desired to remove the baling device from one point to another at a considerable distance, the compressing-frame may be removed from the slots in the cross-bars B and laid upon the base. The base is provided with short pins $a$, which engage the sides of the compressing-frame when it is in such position and prevent its being removed. The bars F may be placed as shown in Fig. 4, alternate bars having their ends placed beneath the standards D' of the compressing-frame. All the parts will thus be held firmly in position, so that they will not be lost.

Having thus fully described my invention, I claim as new and desire to secure by Letters Patent—

1. A portable device, comprising a frame or base adapted to be used as a drag or sled, and having grooves or sockets extending along the center thereof, a vertical compressing-frame fitting in the grooves or sockets upon the base, compressing means on the upper part of the vertical frame, and top and bottom retaining-bars insertible in said frame and adapted to receive the material between them, the upper bars being engaged by the compressing means, substantially as described.

2. A portable baling device, comprising a frame or base adapted to be used as a drag or sled, and having grooves or sockets extending along the center thereof, a compressing-frame fitting within the grooves or sockets upon the base, screw-rods threaded in the upper part of the compressing-frame, and top and bottom retaining-bars extending through said frame and adapted to receive the material between them, the upper bars being engaged by the screw-rods, substantially as described.

3. A portable baling device, comprising a base or platform, a baling-frame having its parts all lying in substantially the same plane and consisting of tension members and beams connecting the ends of the tension members, compressing means carried by one beam of the frame, top and bottom retaining-bars insertible transversely within the frame, and means for removably securing said frame upon the base in an upright position.

4. A portable baling device comprising a base or platform, a baling-frame having its parts all lying in substantially the same plane, and consisting of tension members and beams connecting the ends of the tension members, screw-threaded bars supported by one beam, top and bottom retaining-bars insertible transversely within the frame, and means for removably securing the frame upon the base in an upright position.

CHARLES HEBARD.

Witnesses:
H. L. REYNOLDS,
EVERARD BOLTON MARSHALL.